(12) United States Patent
Willis et al.

(10) Patent No.: US 7,111,414 B2
(45) Date of Patent: Sep. 26, 2006

(54) FOOTWEAR CONSTRUCTION AND METHOD OF MANUFACTURE

(75) Inventors: Charles C. Willis, North Somerset (GB); Lucio Bandini, Montebelluna (IT)

(73) Assignee: Wolverine World Wide, Inc., Rockford, MI (US)

( * ) Notice: Subject to any disclaimer, the term of this patent is extended or adjusted under 35 U.S.C. 154(b) by 243 days.

(21) Appl. No.: 10/706,233

(22) Filed: Nov. 12, 2003

(65) Prior Publication Data

US 2005/0097778 A1    May 12, 2005

(51) Int. Cl.
*A43B 13/02* (2006.01)
*A43B 5/00* (2006.01)
*A43B 13/14* (2006.01)
*A43B 13/28* (2006.01)
*A43B 13/38* (2006.01)
*A43B 13/39* (2006.01)

(52) U.S. Cl. ............ 36/25 R; 36/30 R; 36/32 R; 36/12; 36/22 R

(58) Field of Classification Search ........... 36/113, 36/25 R, 30 R, 32 R, 44, 12, 14, 22 R, 22 A
See application file for complete search history.

(56) References Cited

U.S. PATENT DOCUMENTS

| | | | |
|---|---|---|---|
| 3,729,843 A * | 5/1973 | Greenblatt et al. ............ 36/4 |
| 3,854,227 A | 12/1974 | Borisuck | |
| 4,407,034 A * | 10/1983 | Ralphs ........................... 36/14 |
| 4,829,682 A * | 5/1989 | Gasbarro ....................... 36/29 |
| 4,908,964 A * | 3/1990 | Deem .......................... 36/25 R |
| 5,657,556 A * | 8/1997 | Bemis ......................... 36/30 R |
| 6,014,824 A * | 1/2000 | Gumbert ...................... 36/25 R |
| 6,167,640 B1 * | 1/2001 | Schaefer ........................ 36/12 |
| 6,286,232 B1 * | 9/2001 | Snyder et al. ................. 36/44 |
| 6,481,120 B1 * | 11/2002 | Xia et al. ...................... 36/44 |
| 6,540,864 B1 * | 4/2003 | Chi ............................... 36/44 |
| 6,594,922 B1 * | 7/2003 | Mansfield et al. ............ 36/145 |
| 6,601,319 B1 * | 8/2003 | Clements .................... 36/30 R |
| 6,691,432 B1 * | 2/2004 | Masseron ................... 36/30 R |

FOREIGN PATENT DOCUMENTS

| DE | 1729629 | 7/1971 |
|---|---|---|
| GB | 1351199 | 4/1974 |

* cited by examiner

*Primary Examiner*—Anthony Stashick
(74) *Attorney, Agent, or Firm*—Warner Norcross & Judd LLP

(57) ABSTRACT

A footwear construction including a midsole joined with an upper and an outsole secured to a bottom surface of the midsole. The midsole is direct attached to the upper with a process that forms flashing along the length of the shoe substantially only on the bottom surface of the midsole, but not the sidewalls of the midsole. This flashing is trimmed to form trim lines, which are concealed simply by securing an outsole to the bottom surface of the midsole.

15 Claims, 4 Drawing Sheets

FOOTWEAR CONSTRUCTION AND METHOD OF MANUFACTURE

BACKGROUND OF THE INVENTION

The present invention relates to footwear, and more particularly to a footwear construction and method for making the same.

Most conventional footwear constructions include an upper and an outsole. The upper accepts a wearer's foot, and the outsole contacts the ground and forms a wearing surface of the footwear. Many footwear constructions also include a midsole disposed between the upper and the outsole to provide increased cushion and comfort. Specifically, the midsole is constructed of a soft, resilient material that provides a cushion between the upper and the more rigid and durable outsole.

Footwear including a midsole typically is constructed with a process in which the midsole is "direct attached" to the upper in a mold. Conventional direct attach molds, however, include components that mate with one another in a manner that creates excess material, also referred to as "flashing," on the visible side walls of the completed midsole. This flashing must be trimmed from the side walls of the midsole, and in so doing, forms a trim line on the side walls. To complete the footwear construction, an outsole is glued to the midsole, opposite the upper.

Although direct attach midsole constructions provide footwear with cushioning, the resulting exposed trim line— no matter neatly trimmed—is aesthetically displeasing and gives the footwear an unfinished appearance.

In one effort to conceal the trim line on the midsole side walls, the outsole is formed in a U-shape, with flanges that extend upwardly adjacent the midsole side walls high enough to conceal the trim line. This type of construction is referred to as a "cupped" outsole. Although this construction makes the shoe more aesthetically pleasing, the outsole flanges increase the overall width of the shoe and render the shoe less flexible because the flanges resist bending.

SUMMARY OF THE INVENTION

The aforementioned problems are overcome in the present invention which provides a direct attach midsole including trim lines disposed on a bottom surface of the midsole. These trim lines may be concealed on the bottom of the midsole with an outsole.

The footwear construction of the present invention is manufactured by: providing an upper; direct attaching a midsole to the upper so that a flashing of the midsole is produced substantially only on a bottom surface of the midsole; and securing an outsole to the bottom surface of the midsole. Optionally, the flashing may be trimmed to form trim lines before securing the outsole to the midsole.

The present invention provides a new, aesthetically pleasing footwear construction including trim lines on the bottom surface thereof that may be completely concealed by securing a substantially flat outsole to the midsole. Accordingly, the width of the sole assembly of the footwear construction may be minimized. Moreover, because it is unnecessary to wrap the outsole up the side walls of the midsole, the resulting footwear is substantially more flexible than conventional footwear including cupped outsoles.

These and other objects, advantages and features of the invention will be more readily understood and appreciated by reference to the detailed description of the invention and the drawings.

DETAILED DESCRIPTION OF THE INVENTION

I. Overview

Figure 1:
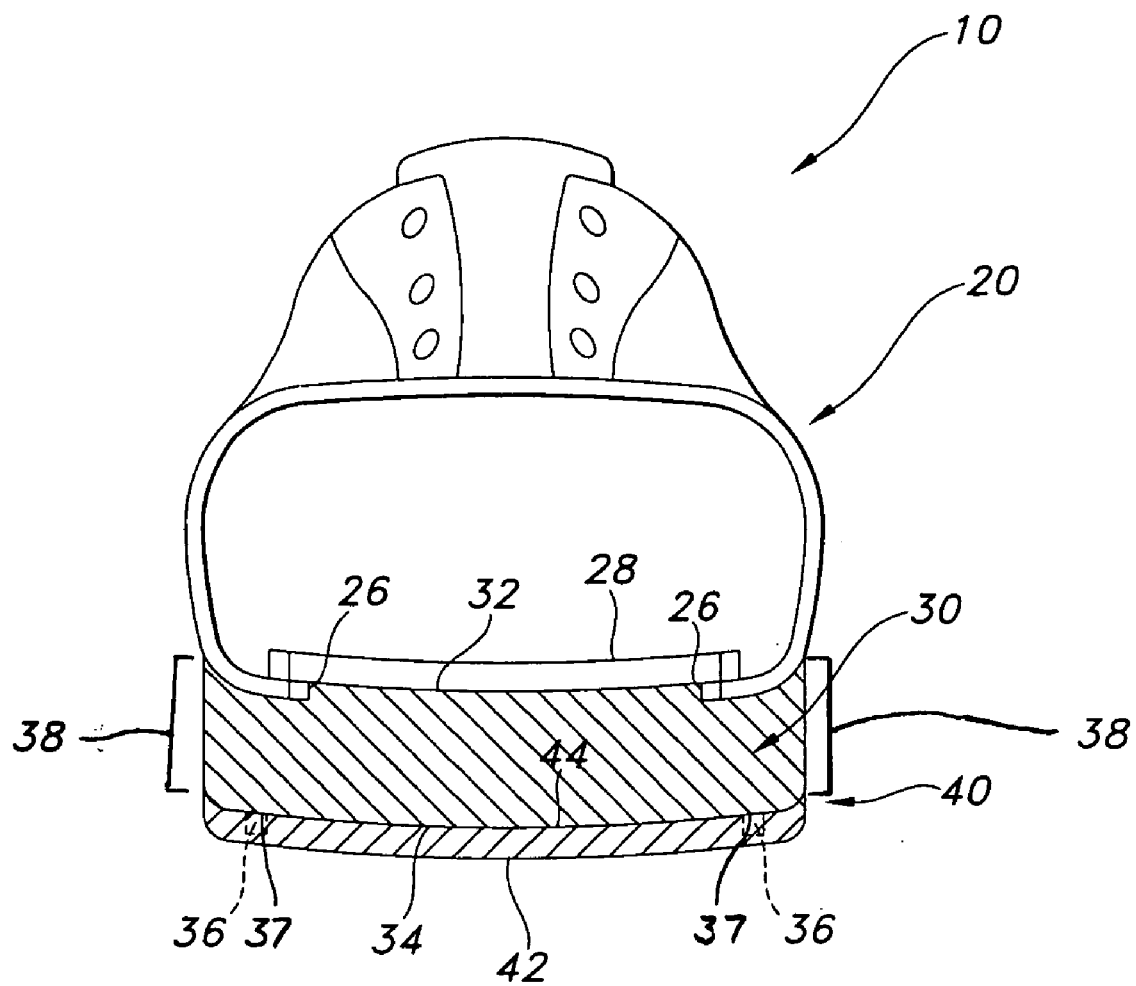
FIG. 1 is a sectional view of an article of footwear incorporating the midsole construction of the present invention.
Figure 2:
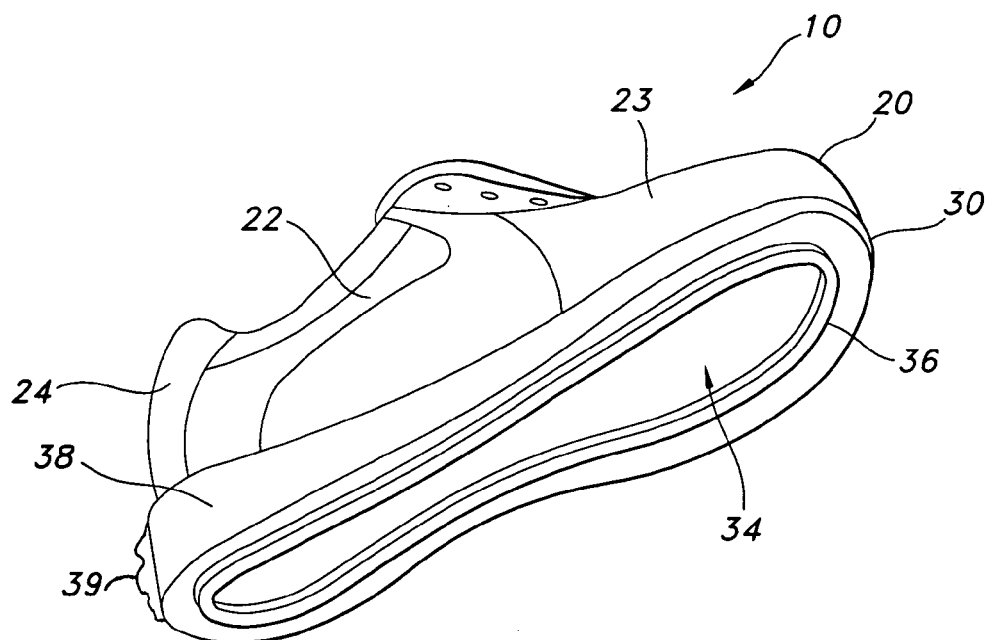
FIG. 2 is a lower perspective view of the article of footwear before a flashing is trimmed from the midsole.
Figure 3:
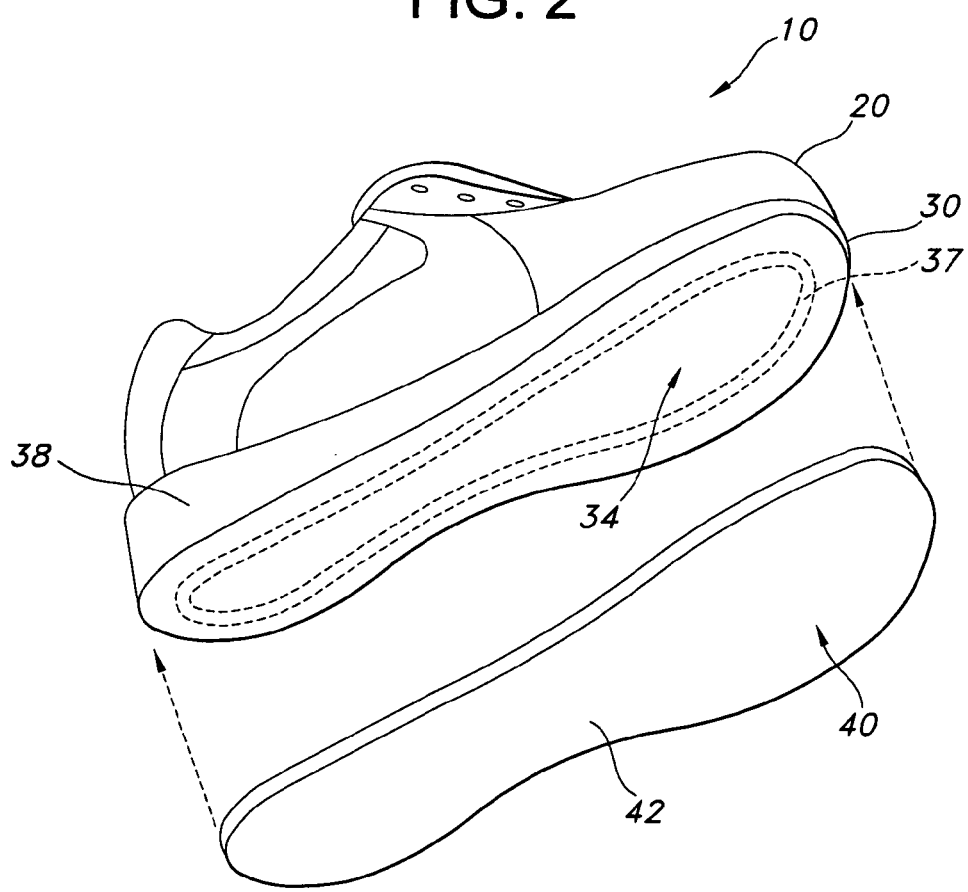
FIG. 3 is a lower perspective view of an article of footwear after flashing is trimmed from the midsole.

A footwear construction in accordance with an embodiment of the present invention is shown in FIGS. 1–3 and generally designated 10. The shoe 10 includes an upper 20 joined with a midsole 30 which is further joined with an outsole 40. The midsole 30 is formed so that excess material, i.e., the flashing 36 (FIG. 2), formed during the molding process of the midsole, is located on substantially only the bottom surface 34 of the midsole. This material 34 is trimmed to form a trim line 37 (FIG. 3) on the bottom surface 34. This trim line 37 is concealed when the outsole 40 is attached to the midsole 30.

For purposes of disclosure, the present invention is described in connection with a casual shoe that includes an upper constructed from multiple panels, i.e., a vamp 23, side panels 22 and a back stay 24. The present invention is, however, well-suited for use in other types of footwear, including other multi-sport footwear, outdoor footwear, walking footwear, athletic footwear and work footwear.

II. Structure

The components of the shoe 10 of the present invention will now be described in more detail. The upper 20 is generally conventional and includes quarters 22, a vamp 23 and a back stay 24. The upper terminates at a lower peripheral edge 26 that is direct attached to the midsole 30. The upper is preferably manufactured from leather, canvas, nylon or other suitable materials and may include a liner (not shown) or other conventional accessories. Opposing lower peripheral edges 26 may be stitched directly together and/or stitched to an insole 28, in the shape of a wearer's foot, to optionally close the lower portion of the upper 20.

The outsole 40 is constructed from a relatively hard rubber or other sufficiently durable and wear-resistant material. The outsole 40 includes an outer surface 42 and an upper surface 44. The outer surface 42 forms a wearing surface of the outsole 40 and may be contoured to define a desired tread pattern. Moreover, the outer surface 42 may be textured to improve the traction and aesthetic appeal of the shoe. In general, the upper surface 44 of the outsole is substantially flat, however, it may also include one or more peripheral walls extending upwardly along the medial and/or lateral sides and/or front and rear of the shoe, along the midsole side walls 38 as desired. Optionally, in extending upward along the midsole, the outsole may include ridges and/or recesses. The upper surface 44 of the outsole may be secured to the bottom surface 34 with cement or other acceptable adhesives.

The midsole 30 includes an upper surface 32, which is direct attached to the upper 20 and/or the insole 28. The midsole further includes exterior side walls 38, which extend vertically downward from the upper 20 to the outsole 40. The side walls 38 also may extend from a forward most portion of the footwear to a rearward most portion of the footwear along the lateral side of the foot and/or the medial side of the foot. Where the midsole side walls 38 terminate at their lowermost portion, the bottom surface 34 of the midsole begins. Incidentally, the midsole side walls may terminate along one or more irregular lines that undulate vertically, i.e., up and down with the height of the midsole, or horizontally, i.e., toward and away from the center line of the footwear. Moreover, the side walls 38 may be textured or contoured to provide a desired appearance or function in the completed footwear. The bottom surface 34 of the midsole extends from one sidewall of the footwear corresponding to the outside of a wearer's foot, to another sidewall of the footwear, corresponding to the inside of a wearer's foot, across a width of the bottom of the midsole. The outsole also may extend from the forward most portion of the footwear to the rearward most portion of the footwear.

As best shown in FIG. 2, the pre-finished midsole 30 includes a flashing 36 on the bottom surface 34 of the midsole. This flashing 36 is formed from excess material that seeps between mold parts during the molding process as described below. The flashing is trimmed by cutting, grinding, melting or otherwise removing the flashing to form one or more trim lines 37 (FIG. 3), which coincide with the location where all or part of the flashing was previously attached to the bottom surface 34 of the midsole 30. The flashing and subsequent trim lines also correspond to the location where one or more side molds abutted against a lower mold to define a midsole cavity. The trim lines may include portions of the flashing that remain and extend from the bottom surface a distance that is small enough that it will not be reflected through the outsole or prevent the outsole 40 from satisfactorily being secured to the bottom surface 34 of the midsole 30.

Although the flashing 36 and trim line 37 are shown generally to correspond to the periphery of the midsole 30, which itself corresponds to the shape of a wearer's foot, these structures may be of any desired shape. In addition to the flashing 36 on the bottom surface 34 of the midsole, other flashing 39 material may be disposed on the rearward most portion of the midsole at a point of introduction of the midsole material in a molding operation, as described below.

As shown best in FIGS. 1 and 3, the upper surface 44 of outsole 40 is secured to the midsole bottom surface 34. Because the trim lines 37 are disposed on only the bottom surface 34 of the midsole, they are concealed by the outsole. FIG. 1 shows where the flashing 36 would have been had it not been trimmed to form midsole bottom surface trim line 37. Moreover, because trim lines are substantially absent from the side walls 38, which extend along the sides of the midsole from the front of the shoe to the rear of the shoe along the length of the shoe, it is unnecessary to wrap the outsole 40 upward from the bottom surface 34 of the midsole and onto the side walls 38 of the midsole. However, if this configuration is desired, the outsole 40 may include walls or flanges that extend upwardly and adjacent the side walls 38.

The midsole 30 is preferably constructed from a resilient and flexible synthetic material, for example, polyurethane. Polyurethane is generally well known in footwear industry; therefore, it will not be described in detail here. The rigidity and flexibility of polyurethane can be varied from application to application as desired using a variety of well-known techniques, such as by adjusting the type, proportion and amount of the reactant to make-up the material. In addition, the rigidity and flexibility of the polyurethane can be varied by adjusting the volume of polyurethane used. Although polyurethane is a preferred midsole material, the density and precise chemical make-up of the midsole material will vary depending on a variety of factors, including the size of the midsole and the desired cushioning and flexibility characteristics of the footwear.

III. Manufacture and Assembly

The shoe 10 is manufactured using direct attach machinery. To begin, the upper is manufactured using generally conventional techniques and apparatus. The desired upper material (not shown) is cut to form the various elements of the upper including the quarters 22, the back stay 24 and the vamp 23. The elements of the upper 20 are then fitted and sewn together. A lining (not shown) may be sewn within the upper during the fitting step. An insole 28 is secured to the lower peripheral edges 26 of the upper 20 with stitching, adhesives or cement. Optionally, the lower peripheral edges 26 of the upper may abut one another about midway across the shoe and be sewn together as desired.

Figure 4:
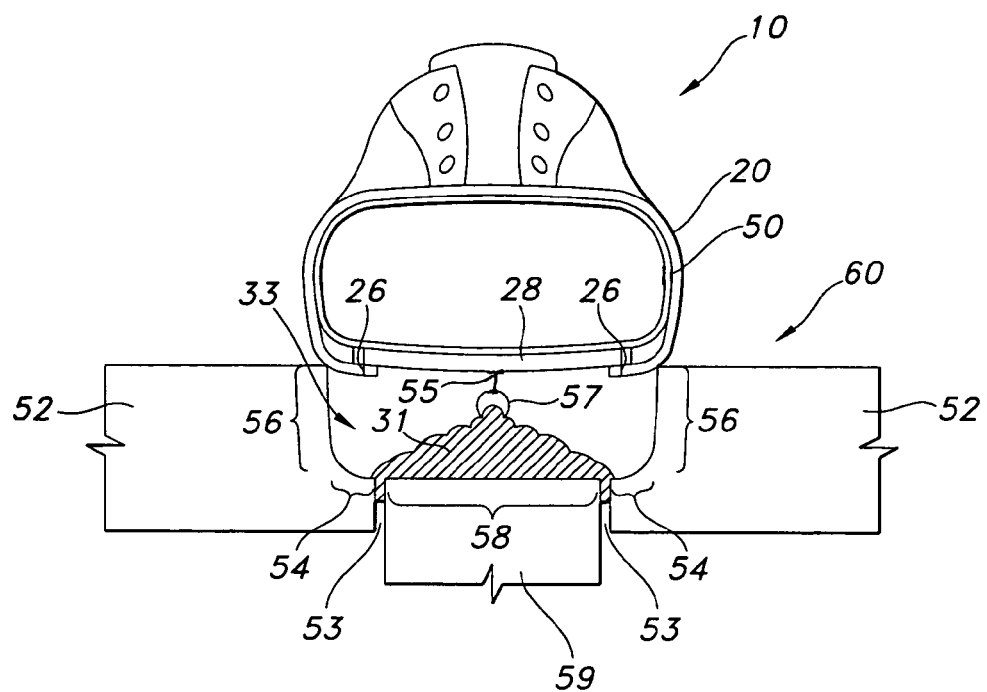
FIG. 4 is a sectional view of a midsole being joined with an upper in a mold.

The fitted upper 20 is stretched over a last 50 in preparation for a direct attach molding operation. The last is lowered against the midsole mold 60 (FIG. 4), which comprises side molds 52 and a bottom mold 59. The side molds 52 and bottom mold 59 cooperate to define a cavity 33 which is, when the last 50 is in the position shown in FIG. 4, defined immediately adjacent the insole 28 and the lower peripheral edge 26 of the upper 20. This cavity 33, also referred to as a "midsole cavity," corresponds generally to the desired shape of the midsole 30.

The side molds 52 include mold side wall surfaces 56 which correspond to the side walls 38 of the midsole 30. The mold side wall surfaces 56 transition to a mold bottom surface 54, which corresponds to a portion of the bottom surface 34 of the midsole 30 after the midsole is formed.

The lower mold 59 abuts the side molds 52, and forms all or part of the bottom surface 34 of the midsole. The lower mold includes a primary mold bottom surface 58, disposed inward from the mold bottom surface 54 and separated therefrom by flashing 53 after the flashing is formed. Despite the abutment of the side molds against the lower mold, there exists bottom seams 53 that are defined between the bottom mold 59 and the side molds 52. Another seam 55 may exist where the two opposing side walls 52 abut one another at the rearward most and/or forward most portion of the midsole cavity 33.

Figure 5:
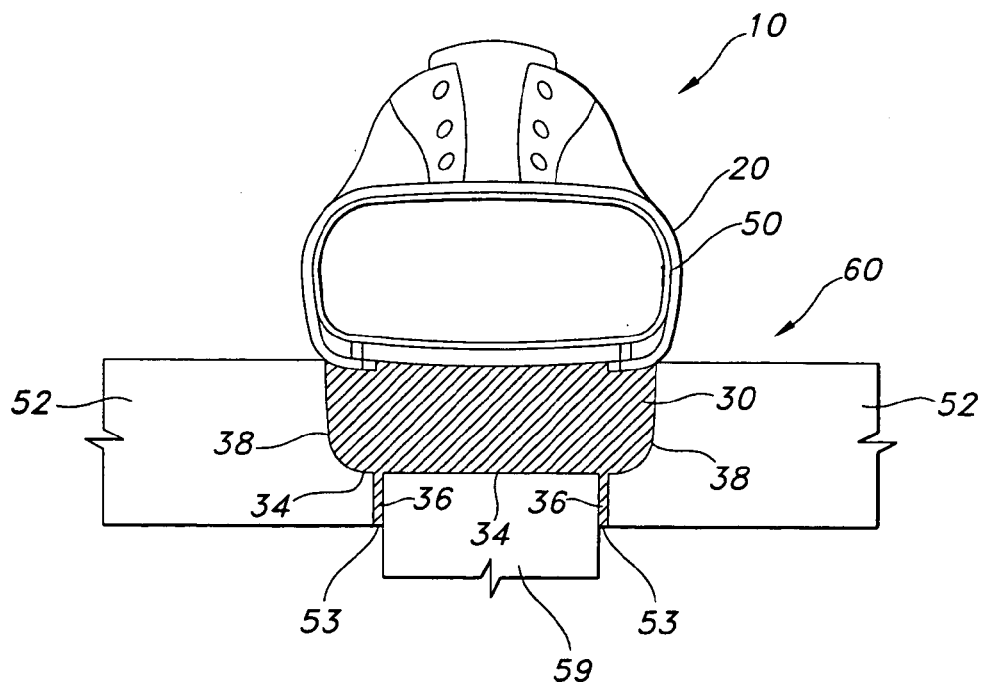
FIG. 5 is a sectional view of a midsole joined with an upper in a mold.

With the components of the mold 60, i.e., the side molds 52 and the lower mold 59, positioned to form the midsole cavity 33, the appropriate volume of material to form the midsole 30 is injected or poured through port 57 into the cavity 33. Preferably, the mold 60 holds the upper 20 firmly enough to prevent material from exiting the mold 60 from the top of the cavity 33. As the material 31 is introduced into the cavity 33, it substantially fills the cavity 33 until the configuration shown in FIG. 5 is achieved. As shown there, excess material seeps into the seams 53 defined between the side molds 52 and the bottom mold 59. This seeping material eventually forms flashing 36 substantially only on the bottom surface 34 of the midsole 30, but not along the side walls 38 of the midsole. The flashing is formed a distance inward 54 from the sidewalls 38, and may be preselected as desired. In one embodiment, the distance 54 is substantially uniform around the periphery of the bottom surface 34 of the midsole. However, as desired, the flashing 36 may be formed at any distance inward from the side walls 38.

Figure 6:
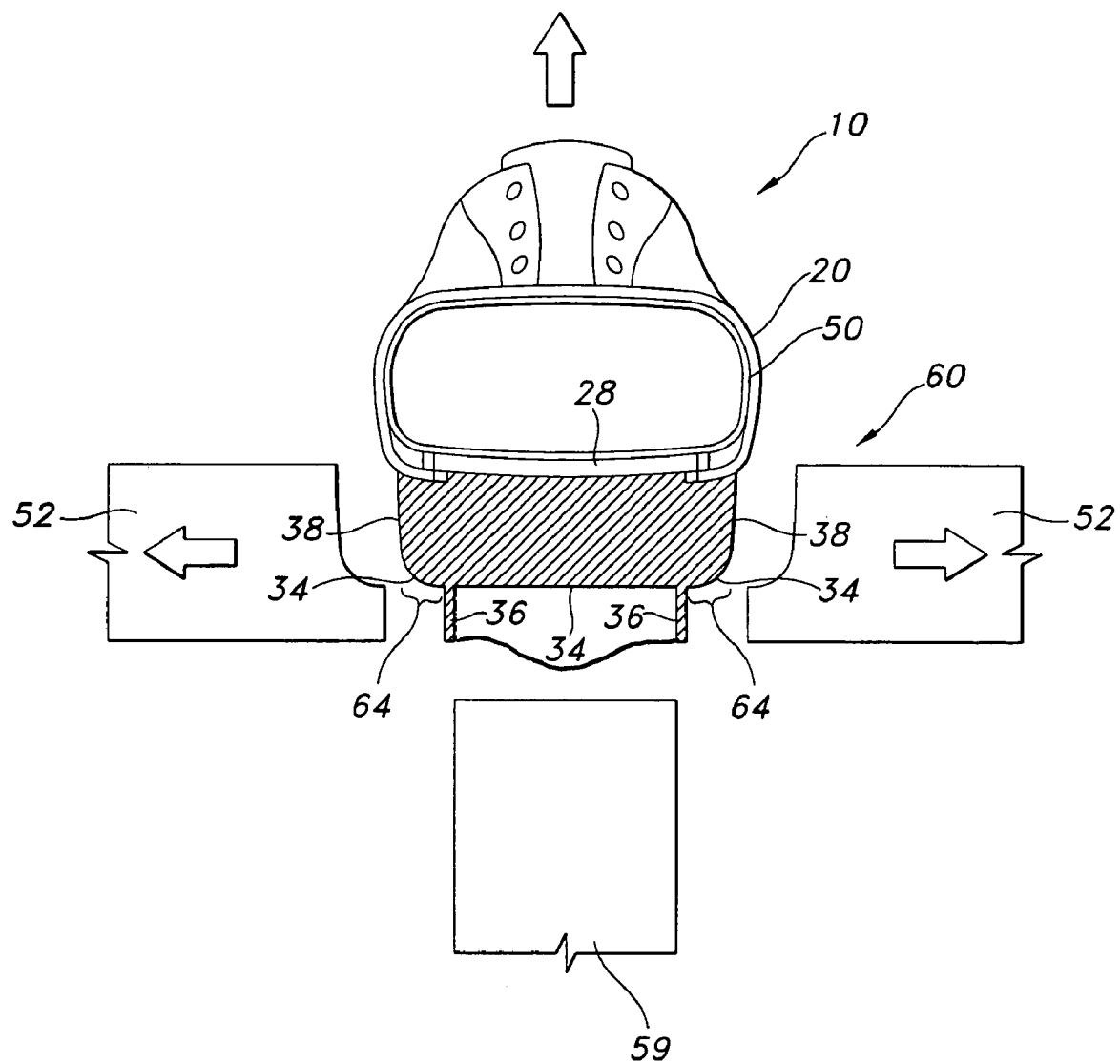
FIG. 6 is a sectional view of a midsole attached to an upper being removed from a mold.

As shown in FIG. 6, after the midsole material 31 has sufficiently cured to direct attach the midsole 30 to the upper 20 and/or insole 28, the last 50 is moved upward in the direction indicated with the vertical arrow. The upper with a direct attached midsole may be removed from the last 50 for trimming.

As shown in FIGS. 2 and 3, the flashing 36 is trimmed from the bottom surface 34 of the midsole, which leaves a trim line 37. Optionally, any lashing 39 at the rear most portion of the midsole may be trimmed to form a single substantially vertical trim line. If flashing is also formed between the side molds at the front most portion of the midsole, it too may be trimmed in a similar fashion. With the flashing trimmed from the bottom surface 34 of the midsole, the outsole is secured to this bottom surface 34 with cement or adhesives as desired. The trim lines 37 that are substantially only on the midsole bottom surface are thus concealed by the outsole 40 when joined with the midsole.

A number of conventional finishing operations are performed on the footwear 10. For example, the edges adjacent the upper 20 are trimmed and shaped; the upper 20 is cleaned, polished and treated as appropriate; and laces are inserted into the eyelets of the upper 20.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. An article of footwear comprising:
   an upper including a lower portion;
   a midsole extending along a length between a forward most portion and a rearward most portion, said midsole including opposing sidewalls that extend from said rearward most portion to said forward most portion and form a visible exterior of said midsole, said midsole including an upper surface and a bottom surface, said upper surface direct attached to said lower portion of said upper, said side walls terminating at said bottom surface said bottom surface being substantially flat between said side walls except for at least one midsole bottom surface trim line positioned inward a preselected distance from said side wall on said bottom surface, said bottom surface trim line coinciding with a former flashing location on the bottom surface, said midsole bottom surface trim line non-coincident with said side wall; and
   an outsole joined with said bottom surface of said midsole and concealing said midsole bottom surface trim line.

2. The article of footwear of claim 1 wherein said outsole is substantially flat and covers the bottom surface of the midsole entirely from one opposing side wall to the other opposing side wall.

3. The article of footwear of claim 1 wherein the midsole bottom surface includes a periphery corresponding to the shape of a wearer's foot.

4. The article of footwear claim 3 wherein the outsole terminates with the midsole bottom surface so that the side wall is substantially uncovered by the outsole and wherein the outsole is visible with the side wall by a viewer from a side view of the footwear.

5. The article of footwear of claim 1 wherein the upper includes an insole, said insole joined with the lower portion of the upper to close the upper.

6. The article of footwear of claim 1 wherein the lower portion includes a peripheral edge bent inward toward the center of the shoe.

7. An article of footwear comprising:
   an upper including a lower portion;
   a midsole extending along a length between a forward most portion and a rearward most portion, said midsole including opposing sidewalls that extend from said rearward most portion to said forward most portion and form a visible exterior of said midsole, said midsole including an upper surface and a bottom surface, said upper surface direct attached to said lower portion of said upper, said bottom surface including at least one midsole bottom surface trim line positioned inward a preselected distance from said side wall on said bottom surface, said midsole bottom surface trim line non-coincident with said side wall; and
   an outsole joined with said bottom surface of said midsole and concealing said midsole bottom surface trim line,
   wherein the midsole includes a side wall trim line in substantially only at least one of the forward most portion and the rearward most portion of the midsole.

8. The article of footwear of claim 7 wherein the side wall trim line is substantially only vertical.

9. The article of footwear of claim 1 wherein the midsole is visible by a viewer between the outsole and the upper from a side view of the footwear.

10. A footwear construction comprising:
    an upper;
    a midsole including a lateral side wall, a medial side wall, an upper surface direct attached to said upper, and a bottom surface, said bottom surface bounded along a medial edge by said medial sidewall and a lateral edge by said lateral side wall, said medial side wall and said lateral side wall extending only upwardly from said bottom surface to said upper, said midsole including a bottom surface trim line positioned inward from said lateral side wall and said medial side wall, said bottom surface trim line coincident with a mold flashing location on the bottom surface; and
    an outsole joined with said midsole bottom surface that conceals substantially all of said bottom surface trim line.

11. The footwear construction of claim 10 wherein said outsole is substantially flat and extends across the width of the entire midsole.

12. The footwear construction of claim 10 wherein said midsole bottom surface trim line corresponds to the shape of a wearer's foot.

13. A footwear construction comprising:
    an upper;
    a midsole including a lateral side wall, a medial side wall, an upper surface direct attached to said upper, and a bottom surface, said bottom surface bounded along a medial edge by said medial side wall and a lateral edge by said lateral side wall, said medial side wall and said lateral side wall extending upwardly from said bottom surface to said upper, said midsole including a bottom surface trim line positioned inward from said lateral side wall and said medial side wall; and
    an outsole joined with said midsole bottom surface that conceals substantially all of said bottom surface trim line.

wherein said lateral side wall and medial side wall terminate in at least one of a forward portion and a rearward portion of the midsole, and wherein a side wall trim line is positioned in substantially only at least one of said forward portion and rearward portion.

14. The footwear construction of claim 10 wherein the upper includes a lower portion and an insole is secured to the lower portion, wherein the midsole is direct attached to the insole.

15. A footwear construction comprising:

an upper;

a midsole including a lateral side wall, a medial side wall, an upper surface direct attached to said upper, and a bottom surface, said bottom surface bounded along a medial edge by said medial side wall and a lateral edge by said lateral side wall, said medial side wall and said lateral side wall extending upwardly from said bottom surface to said upper, said midsole including a bottom surface trim line positioned inward from said lateral side wall and said medial side wall; and an outsole joined with said midsole bottom surface that conceals substantially all of said bottom surface trim line, wherein said midsole includes a first vertical side wall trim line at a forward most portion of the midsole and a second vertical side wall trim line at a rearward most portion of the midsole.

* * * * *